United States Patent
Bhagwan

(10) Patent No.: US 9,413,698 B2
(45) Date of Patent: Aug. 9, 2016

(54) SYSTEM AND METHOD FOR EMAIL PRE-DELIVERY

(71) Applicant: YAHOO! INC., Sunnyvale, CA (US)

(72) Inventor: Varun Bhagwan, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 260 days.

(21) Appl. No.: 14/293,442

(22) Filed: Jun. 2, 2014

(65) Prior Publication Data

US 2015/0350116 A1   Dec. 3, 2015

(51) Int. Cl.
*G06F 15/16* (2006.01)
*H04L 12/58* (2006.01)
*H04W 4/00* (2009.01)
*H04L 29/06* (2006.01)

(52) U.S. Cl.
CPC ............... *H04L 51/00* (2013.01); *H04L 51/12* (2013.01); *H04L 67/42* (2013.01); *H04W 4/008* (2013.01); *H04L 51/18* (2013.01)

(58) Field of Classification Search
USPC ................................................ 709/206, 232
See application file for complete search history.

(56) References Cited

U.S. PATENT DOCUMENTS

| 7,672,436 | B1 * | 3/2010 | Thenthiruperai | H04M 1/72552 379/88.04 |
| 2004/0030917 | A1 * | 2/2004 | Karamchedu | G06F 21/606 726/3 |
| 2008/0270567 | A1 * | 10/2008 | Stiers | H04L 65/605 709/217 |
| 2014/0095631 | A1 * | 4/2014 | Ravi | H04L 51/12 709/206 |

* cited by examiner

*Primary Examiner* — Liangche A Wang
(74) *Attorney, Agent, or Firm* — James J. DeCarlo; Greenberg Traurig LLP

(57) ABSTRACT

Disclosed is a system and method for automatically pre-delivering messages such as emails that satisfy a certain criteria. Upon a received email satisfying certain criteria conforming to a pattern, an appropriate rule is triggered which pre-delivers an email(s) to other appropriate inboxes. The pre-delivered emails are marked with a display flag and a time-to-live (TTL) flag. The display flag masks the pre-delivered email. The display flag results in the pre-delivered email being hidden until the sending user actually executes the send/forward action. At that time, the display flag is toggled so that the pre-delivered email is instantly displayed in the recipient's inbox. The TTL flag set enables pre-delivered emails to have a life-span, such that in cases where the user chooses not to forward/send the email, they auto-destruct after a period of time.

17 Claims, 6 Drawing Sheets

SYSTEM AND METHOD FOR EMAIL PRE-DELIVERY

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to email management, and more specifically, towards systems and methods for automatically pre-delivering emails that conform to identified patterns and satisfy associated rules.

RELATED ART

Electronic mail ("email") usages have become omnipresent in everyday use for online users as larger numbers of people are able to access the Internet from an array of devices. In addition to providing a way for individuals to communicate more efficiently with each other, electronic mail also provides an effective form of communication for individuals, businesses, organizations, and other entities interested in communicating with large groups of people, such as friends, family, current and customers, and the like. Thus, electronic communications, such as electronic mail, provide a powerful means of communicating content to a targeted audience. As such, the speed of email delivery has become a primary factor in optimizing the delivery of such communications.

SUMMARY

The present disclosure describes systems and methods for automatically pre-delivering emails. The present disclosure describes systems and methods for determining whether a received email fits particular criteria. According to some embodiments, such criteria is associated with, but is not limited to, specific email patterns, sender information, subject information, receiver information, timing or the email's temporal information, content and the like. Upon satisfaction of such criteria, an appropriate rule is triggered which pre-delivers an email(s) to other appropriate inboxes. The pre-delivered emails include a display flag and a time-to-live (TTL) flag. The display flag masks (or hides) the pre-delivered email. That is, the display flag results in the pre-delivered email not being shown in the recipient's inbox (or being hidden or cloaked) until the sending user actually executes the send/forward action. In some embodiments, the display action for the email is set to the binary value of "0" upon the display flag value being set at false. Upon an executed send/forward action, the display flag is toggled (or set to "1") so that the pre-delivered email is instantly displayed in the recipient's inbox (or appropriate folder). Thus, by pre-delivering the emails, the disclosed systems and methods remove nearly all data-transfer time from forwarded emails that starts when a user forwards an email. The systems and methods also achieve a near-instant deliver speed for emails of variable payload, which is immensely useful for emails that are extremely large in size. The TTL (time-to-live) flag set enables pre-delivered emails to have a life span, such that in cases where the user chooses not to forward/send the email, the pre-delivered emails can be purged after a period of time (thereby minimizing impact on storage space).

In accordance with one or more embodiments, a method is disclosed which includes receiving, at a computing device, a first email addressed to an inbox associated with a user; analyzing, via the computing device, information associated with the first email, said analysis comprising comparing the email information with pattern information associated with the user; creating, via the computing device, a second email for delivery from the user to a second user, said second email comprising a first display value dictating display in an inbox of the second user, said creation based upon said comparison of the email information and the pattern information, said second user identified as a recipient within the pattern information; and pre-delivering, via the computing device, the second email to the inbox of the second user, said pre-delivery comprises communicating the second email to the second user without visibly displaying the second email in the inbox of the second user. According to some embodiments, the second email further comprises a time-to-live (TTL) value, where the TTL value dictates a time period the second email is available for visible display prior to receiving the indication (e.g., delivery action).

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for automatically pre-delivering emails that conform to identified patterns and satisfy associated rules.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
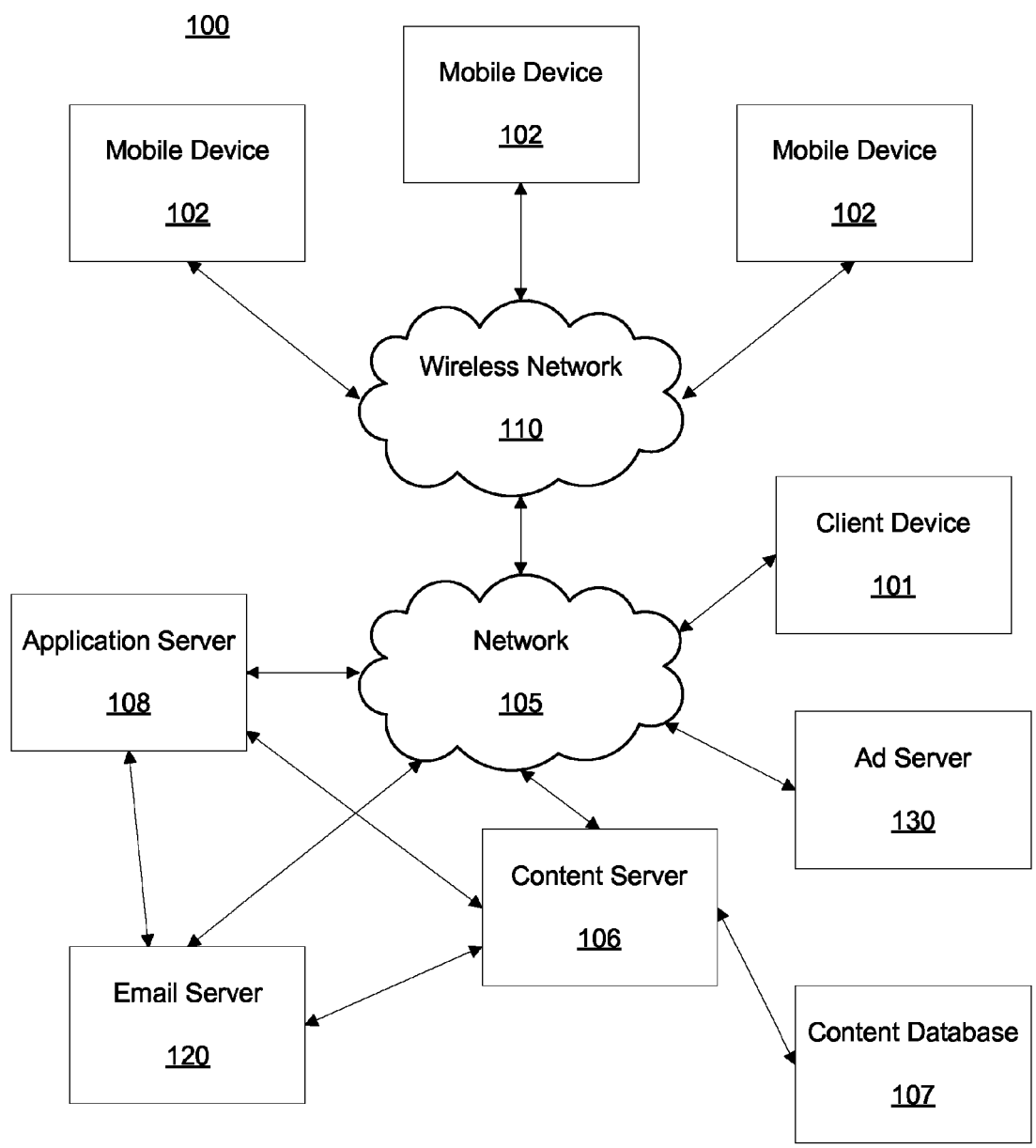
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Modern active email users receive a large number of email messages as usages for such messaging have become omnipresent. Indeed, electronic mail usages are on the rise as they provide a powerful means of communicating content to a targeted audience. As such, the speed of email delivery has become a primary issue in optimizing the delivery of such communications.

Traditional efforts to optimize email communications involve a user assembling content and distributing content to selected recipients either according to created-rules or according to future scheduling protocol. While this may provide an effective strategy in many circumstances, it requires significant computational resources to provide access and control of the content to be incorporated into the message, as well as human resources to direct the creation of the message. Such techniques are limited in scale and are agnostic to the type of emails being communicated.

The present disclosure addresses such shortcomings by providing for near-instant speed delivery of emails of variable payload. This is achieved by automatically pre-delivering emails that satisfy certain criteria, as discussed in more detail below. Users typically follow a pattern when they get emails that fit a certain criteria (sender, subject, to/cc-list etc.). In a number of cases, they forward the emails to one or more other email addresses (common examples of such email-types include travel itineraries, shipping confirmation, ticket purchases, invitations, marketing emails). The present disclosure describes systems and methods for determining whether a received email fits criteria that conform to a pattern of activity associated with the user. Upon satisfaction of such criteria, an appropriate rule is triggered which pre-delivers an email(s) to other appropriate inboxes in accordance with the recognized pattern. The pre-delivered emails include a display flag and a time-to-live (TTL) flag. The display flag masks (or hides) the pre-delivered email. That is, the display flag results in the pre-delivered email not being shown (or being hidden or cloaked) until the user actually executes the send/forward action. The display action for the email is set to the binary value of "0" upon the display flag value being set at false. Upon an executed send/forward action, the display flag is toggled (or set to "1") so that the pre-delivered email is instantly displayed in the recipient's inbox. Thus, the disclosed systems and methods remove all data-transfer time from forwarded emails. The TTL (time-to-live) flag set enables pre-delivered emails to have a life span, such that in cases where the user chooses not to forward/send the email, the pre-delivered emails can auto-destruct/be purged after the specified time period has elapsed (thereby minimizing impact on storage space).

As a result of implementation of the present disclosure, users will not have to wait for an email to be sent over the network and copied over to their inbox to view an email. That is, users will be afforded the ability to see the email the moment the sender hits forward (or send). Furthermore, the disclosed systems and methods significantly improve the speed of all other operations. Currently, typical write operations on a mailbox hold a lock. That is, upon an inbox receiving an email, all write actions are locked in order to avoid corruption and for security reasons. This causes high latency and contention during heavy usage times ("peak-hours"), such as during the day when users are actively composing, forwarding, sending messages (e.g., Monday morning). The present disclosure minimizes the write operation by enabling messages to be pre-delivered to their inbox, whereby upon the user actually sending the message, the message has been already sent which results in simply displaying the previously received message. In some embodiments, the disclosed systems and methods can schedule "writes" during "off-peak" hours. This will reduce mailbox locking/contention for writes, thereby enhancing user experience and overall speed.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, email server 120 and advertising ("ad") server 130.

One embodiment of mobile devices 102-103 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, email services, instant messaging (IM) services, SMS services, MMS services, FTP services, voice over IP (VOIP) services, or the like. Such services, for example the email services and email platform, can be provided via the email server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102. In some embodiments, applications, such as a photo-sharing or viewing application (e.g., Flickr®, Instagram®, and the like), can be hosted by the application server 108. Thus, the application server 108 can store various types of applications and application related information including application data and user profile information. In another example, email server 120 can host email applications; therefore, the email server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
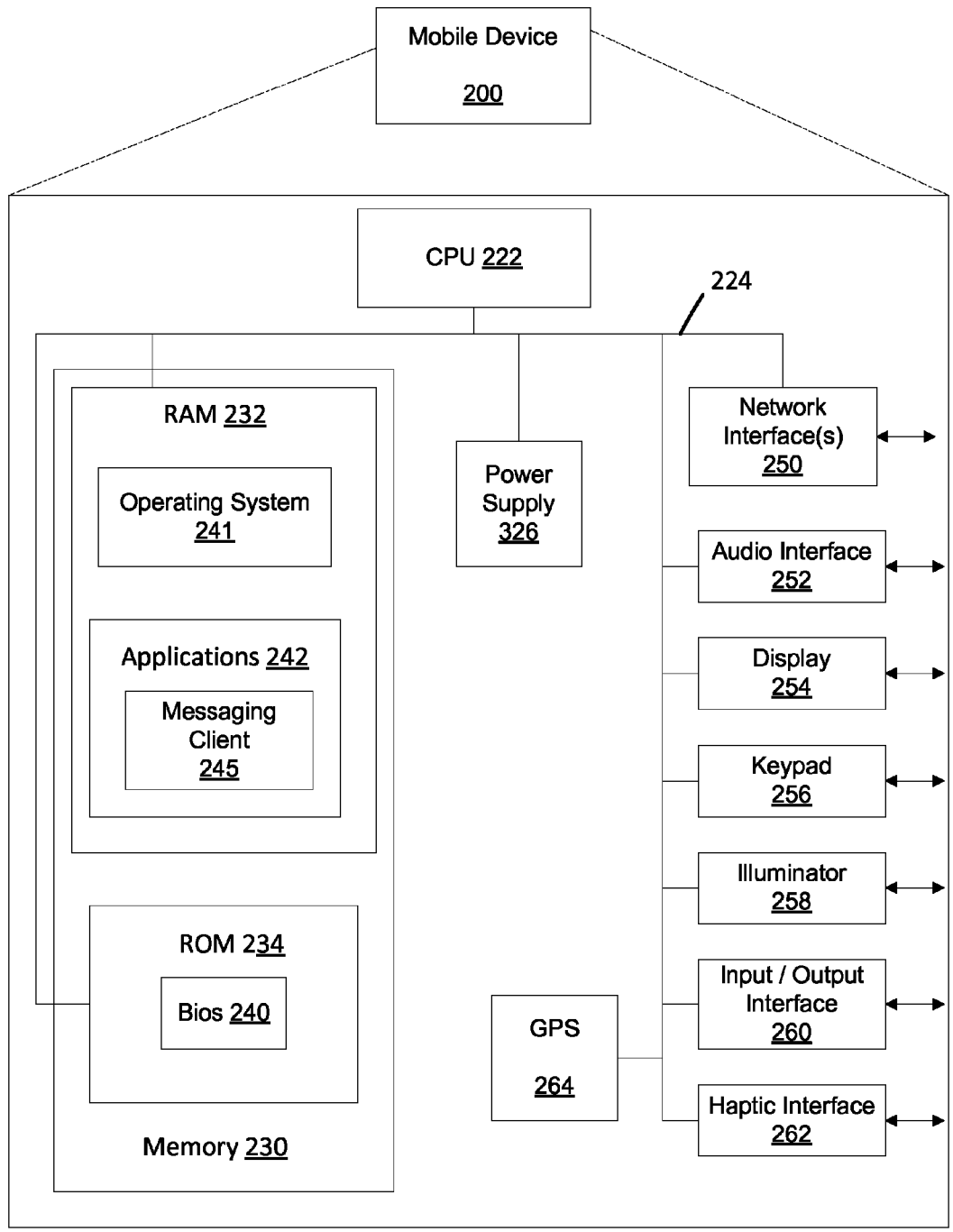
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described.

Figure 3:
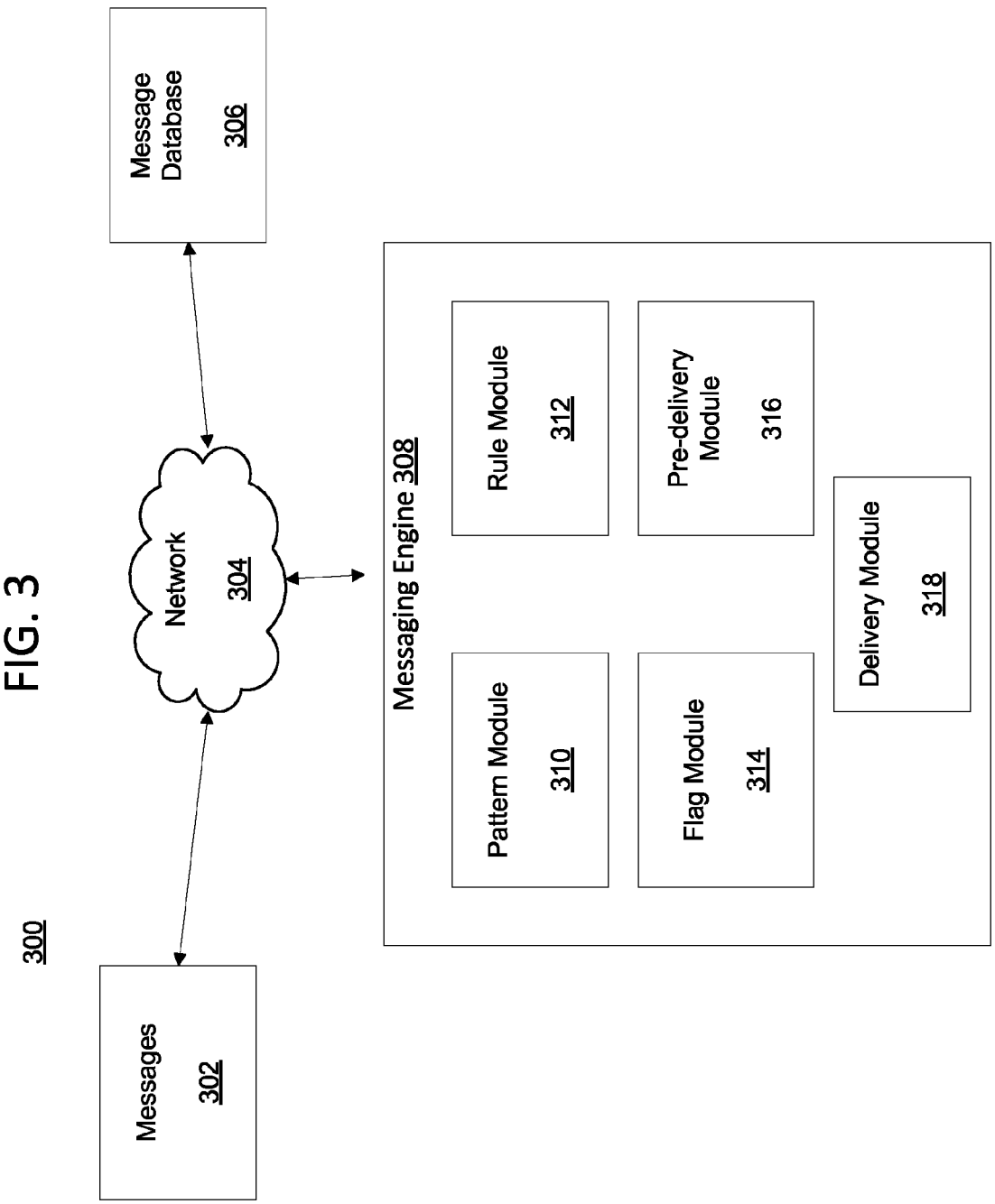
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes a plurality of messages 302, a network 304, a messaging engine 308 and a database 306 for storing messages. The message engine 308 could be hosted by a web server, content provider, email service provider, ad server, a user's computing device, or any combination thereof. The plurality of messages 302 can be any type of message. Examples of such messages 302 can include email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages 302 can be provided to the message engine 308 or accessed by a computer program or device that can access the messages. In some embodiments, the messages 302 can be stored in a database of stored messages 306, which is associated with an email provider, such as Yahoo! Mail®. The database 306 can be any type of database or memory that can store the messages 302 and associated message template information, as discussed above. For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multi-media Message Service (MMS) messages, and the like) can be received and/or or accessed and processed by the message engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the message engine 308, and the database of stored resources 306.

The message engine 308 includes a pattern module 310, a rule module 312, a flag module 314, a pre-delivery module 316 and a delivery module 318. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIG. 4, whereby the components of system 300 are implemented to perform the steps and processes of process 400.

Figure 4:
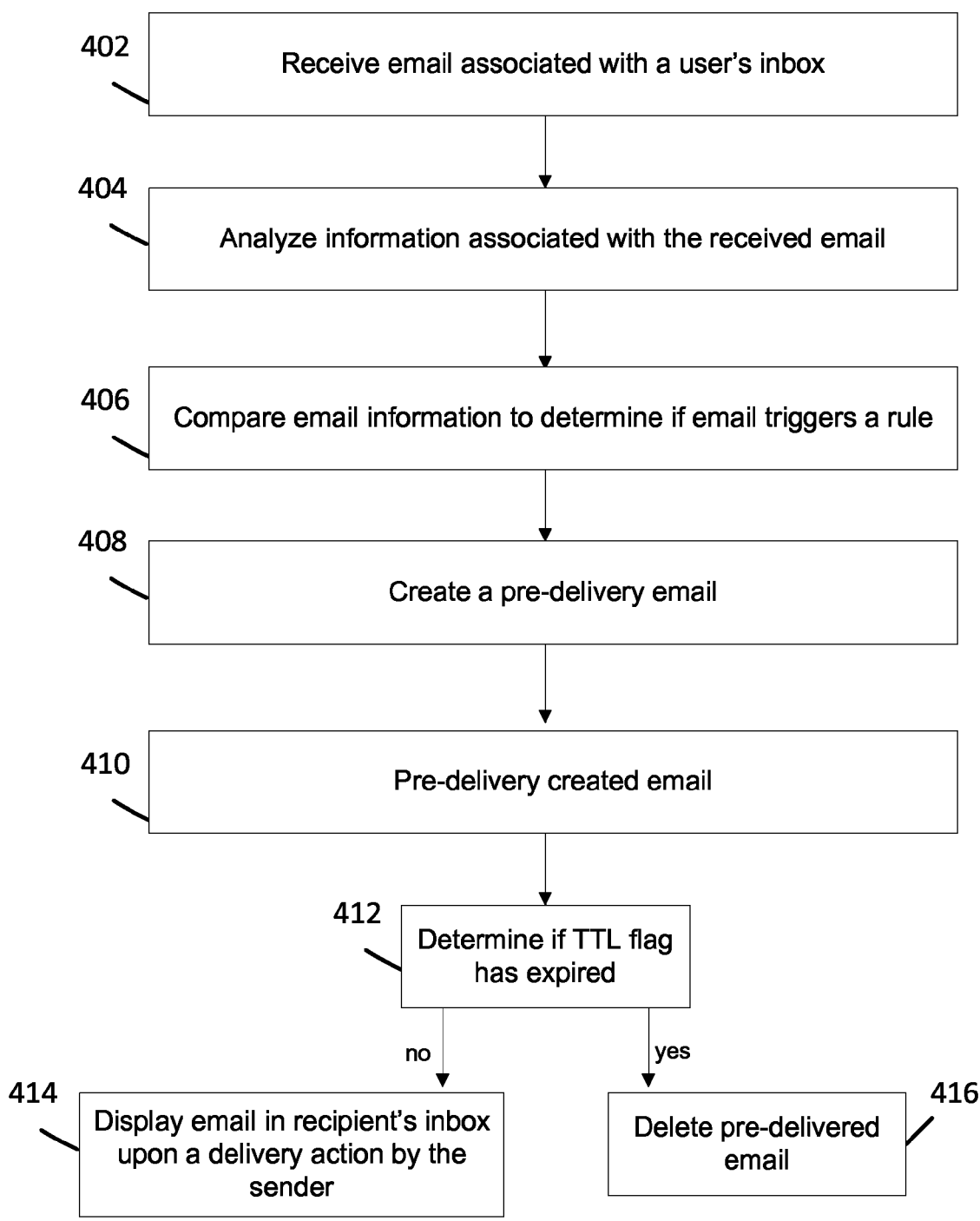
FIG. 4 is a flowchart illustrating steps performed in accordance with some embodiments of the present disclosure.

FIG. 4 is a process 400 diagram illustrating steps performed in accordance with embodiments of the present disclosure. As discussed above, the present disclosure involves automatically "pre-delivering" emails. As used herein, as will be understood further in context with the disclosure, pre-delivering or pre-delivery is intended to mean the delivery of an email or message to the mailbox or inbox of a recipient in a manner such that the receipt of the pre-delivered email is not evident to the recipient (e.g. it does not appear in the recipient's inbox) even though the message is actually stored in the email storage associated with the recipient. That is, when a user receives an email that satisfies some pattern criteria, the received email is then pre-delivered to other appropriate inboxes, as discussed in more detail herein. The pre-delivered emails include a display flag and can also include a time-to-live (TTL) flag. The display flag masks (or hides) the pre-delivered email. That is, the display flag results in the pre-delivered email being hidden from display in the recipient's inbox until the sending user actually executes the send/forward action. The TTL (time-to-live) flag set enables pre-delivered emails to have a life span, such that in cases where the user chooses not to take action to forward/send the email, the pre-delivered emails will auto-destruct/delete after a period of time (thereby minimizing impact on storage space). Thus, the disclosed systems and methods provide for near-instant delivery speeds, and at least improved delivery speeds, for emails of variable payload.

By way of a non-limiting example, according to embodiments discussed herein, Bob receives an itinerary email from an airline or travel agent. For the purpose of non-limiting example, assume such an email is sent to Bob by JetBlue® after booking airline tickets for an upcoming trip. Bob typically forwards such types of emails (especially airline ticket itinerary emails) to Jill (his wife). As discussed in more detail below, this behavior or pattern is recognized by the disclosed systems and methods, and thereby triggers a rule. In this case, the rule associated with such pattern triggers the JetBlue® email being automatically pre-delivered or forwarded to Jill. As discussed herein, such pre-delivery involves the email being sent to Jill's inbox; however, the message is not displayed in her inbox. The message is hidden due to the display flag being set to "false" upon it being first sent. This pre-delivered email can be sent during times of low or "off-peak" network or system utilization to better manage bandwidth utilization in the email system and associated network(s).

Sometime in the future, Bob may act in his usual way and forward or send the itinerary to Jill. When Bob forwards/sends the travel itinerary email to Jill, this will not result in the email being re-sent but rather will trigger a transmission to trigger the display flag in the pre-delivered email to change to "true." In other words, when Bob finally "forwards" the email to Jill no further email is sent, but rather the previously pre-delivered (and hidden) email will be displayed (or appear) in Jill's inbox by virtue of receipt of the flag change message. The timestamp for such delivery will be associated with the time Bob actually sent/forwarded the email (not the pre-delivery time). However, embodiments can exist where the timestamp may be associated with the pre-delivery time.

Expanding upon the above example, the pre-delivered email also carries a TTL flag. This flag designates a time period or life span for which the pre-delivered email may be displayed in the recipient's inbox. Should the TTL flag expire (or the time period for the email's "life" runs out), then pre-delivered email will auto-destruct (or delete despite not being actually opened or displayed). In some embodiments, the pre-delivered email will sit idle during the TTL time span on the web server/email server, and in some embodiments, the email will be delivered to a user device; however, in both cases, until a delivery action is triggered by the sender, the message will remain hidden. Therefore, for example, the TTL flag of Bob's email to Jill was 24 hours. If 24 hours has passed since Bob received the JetBlue® email, and Bob has yet to take action to forward/send that email to Jill, the pre-delivered email will auto-destruct/delete. The TTL flag's time period/life span can be set by a user, the system, a service provider, the network, a third party, the sender of the original email, or any combination thereof. In some embodiments, should a user send/forward the email prior to the TTL flag's period expiring, the TTL flag is deemed satisfied and can be changed to a null value.

Turning back to FIG. 4, process 400 begins at Step 402 when a user receives an email in the user's inbox. Upon reception, the email is analyzed to identify email criteria (or information), as in Step 404. Email criteria can include, but is not limited to, sender information, recipient information, content, message format/structure, subject, cc/bcc information, temporal information, and all other types of information associated with or comprised within an email and/or email metadata.

In some embodiments, Steps 402 and 404 involve monitoring the user's inbox and messaging behavior to identify and compile patterns of activity for the user. Such monitoring and compilation are performed by the pattern module 310 of the messaging engine 308. Specifically, communicated messages over a network are analyzed to identify patterns of activity associated with a user's inbox. That is, as discussed herein, users typically follow a pattern when they receive emails that fit a certain criteria. Such criteria can include, but is not limited to, the sender, subject, to/cc-list, content, timing of email, and the like. The instant disclosure utilizes recognized patterns associated with certain email criteria in order to pre-deliver messages according to pre-defined rules corresponding to such patterns, as illustrated from the above example.

In some embodiments, the monitoring of emails occurs from (or within) a single message platform, e.g., Yahoo! Mail®; and in some embodiments, the monitoring of messages occurs across multiple platforms, such as Yahoo! Mail®, Google Mail®, Hotmail®, and other personal and business email platforms, such as Microsoft Outlook®, and the like. This monitoring can occur by analyzing all incoming and outgoing messages from all accounts, and parsing message traffic on a network to identify regular expressions associated with the electronic messages. This monitoring (or identifying) occurs for every user's inbox. Such monitoring and/or analysis can be based any known or to be known learning/monitoring, mining and/or prediction techniques and/or algorithms in order to efficiently and properly compile such message patterns for a user's inbox, and/or any data attributes and details related to the messages on a network. According to some embodiments, monitoring can occur offline and/or online, in order to continuously update and/or build a listing of identified patterns.

According to some embodiments, the pattern module 310 can employ known or to be known machine learning techniques to identify similarities between emails and their evolving counterparts due to changes and advances in email, communication and security protocols for such messages. Thus, the pattern module 310 is initially programmed or trained with a set of valid patterns, and as the process 400 compiles the patterns, as discussed above, this set of expressions evolves. The pattern module 310 then analyzes each message (e.g., format and/or message body) and based on determined information between each message body, determines how similar each message is in format. By way of non-limiting example, solely for illustration purposes and not to be construed as limiting in nature regarding the values or characteristics the pattern module 310 utilizes to perform the above comparison, the pattern module 310 can compare various features for HTML messages including, but not limited to, a determined edit distance between HTML tags, HTML comments, or the content and/or layout of the message itself.

In some embodiments, patterns can be based upon, but not limited to, a term, word, phrase or combination of words and characters or numbers that typically appears in an email message. In some embodiments, email patterns can also or alternatively be based upon pattern or structure of content within an email, such as email templates. Therefore, process 400 involves continuously identifying and compiling patterns from email traffic of a user's inbox. For example, from the above example, Bob usually sends emails containing travel itineraries to his wife, Jill; therefore, a pattern is recognized, and whenever Bob receives a travel itinerary from a transportation provider or travel agent, such pattern is utilized for calling a rule, as discussed below with reference to Step 406.

Step 406 involves comparing the email criteria to determine whether a pattern is recognized. If a pattern is recognized, a corresponding rule is then identified. Step 406 is performed by the rule module 312. As discussed above, a pattern is typical activity a user performs when receiving an email having certain criteria that is tracked over time. In some embodiments, a pattern may be based on a threshold or probability, such that an amount or type of content/criteria is required for a pattern to be recognized. Each pattern is associated with a rule. Each rule involves a type of pre-delivery action.

For example, when James receives emails comprising shipping information for packages, James typically forwards these emails to his roommate. Here, the email criteria is the shipping information, and the pattern is that James forwards such emails to his roommate. Therefore, an established rule is that upon recognizing an email corresponding to shipments addressed to James' address, such emails will be automatically pre-delivered to James' roommate.

In another example, whenever Jane receives an email for purchased tickets for concerts, she forwards these emails to her brother Frank. Thus, identified email criteria are the ticket information and the pattern involves forwarding such emails to Frank. Thus, as discussed herein, when Jane receives ticket emails, a rule is triggered which pre-delivers the emails to Frank.

Thus, rules are based on the pattern. Should the pattern represent a certain type of activity, then the rule associated with the pattern triggers a pre-delivery of such type of activity. It should be understood that the rule need not be solely associated with forwarding emails. In some embodiments, a rule can be associated with other activities, such as, but not limited to, generation of a calendar appointment/event. For example, when Jane receives the ticket email for the concert, she typically puts the concert information in her calendar. The present disclosure can involve systems and methods for pre-delivering a calendar reminder in Jane's (or another user's) calendar, whereby upon Jane actually setting the calendar reminder, the reminder would then be made visible as described above via the setting or controlling of a flag or other variable that controls display of such entries.

Turning back to FIG. 400, after recognizing that a received email evokes a pattern of activity by the receiving user and identifying the associated rule, as in Step 406, a pre-delivery email is created according to the rule. Step 408. Step 408 involves creating an email with the display flag and the TTL flag. Step 408 is performed by the flag module 314. The flags discussed herein can be within the email or within the email's metadata (e.g., header). Further, the flags can be any type of known or to be known key value pair supported by an email system, or other known or to be known messaging system or platform for communicating with other users of a network.

As discussed above, the pre-delivery emails include a display flag and a time-to-live (TTL) flag. The display flag acts to mask (or hide) the pre-delivered email. That is, the display flag results in the pre-delivered email not being shown (or being hidden or cloaked) until the user actually executes the send/forward action. The display action for the email is set to the binary value of "0" upon the display flag value being set at false. Upon an executed send/forward action, the display flag is toggled (or set to "1") so that the pre-delivered email is instantly displayed in the recipient's inbox. The TTL flag set enables pre-delivered emails to have a life span, such that in cases where the user chooses not to forward/send the email, the pre-delivered emails will auto-destruct after a period of time.

In Step 410, the created pre-delivery email is then transmitted to the intended recipient's inbox. Step 410 is performed by the pre-delivery module 316. According to some embodiments, Step 410 may involve waiting until "off-peak" times to pre-deliver messages. That is, during heavy usage times (e.g., peak hours), which can include times of the day/week when users are actively composing, forwarding and sending messages, the disclosed systems and methods may delay or otherwise manage pre-delivering messages to avoid high latency and contention within the bandwidth of certain networks/email systems. Waiting for off-peak hours or times (or other periods of low utilization) lowers the lock time and lock frequency of the receiving inbox (which occurs each time an email is delivered, as discussed above), and thereby reduces the latency of email delivery. For example, on Monday morning, the system may be set to idle, and wait until Monday evening to send pre-delivered messages—due to the high traffic and message activity that typically takes place on a Monday morning. In some embodiments, a threshold or predetermined factor may be analyzed respective email traffic (e.g., activity), in that should the threshold or factor be met or exceeded by the amount of email traffic happening within the network (or respective a service provider), then pre-delivery may be halted or put on hold until activity has subsided.

In Step 412, a determination is made regarding whether the TTL flag's time span has expired. That is, as discussed above, when the pre-delivery email is created, a TTL flag is included. The TTL flag designates a time period/life span for which the pre-delivered email may be formally delivered (i.e., visibly displayed in the recipient's inbox). Should the TTL flag expire (or the time period run out) prior to the sender performing a delivery action (e.g., sending or forwarding the email), then pre-delivered email will auto-destruct (or delete from the recipient's inbox despite not being actually displayed). In some embodiments, should a user send/forward the email prior to the TTL flag's period expiring or during an "off-peak" time, the TTL flag is deemed satisfied and can be set to "off" (or in some embodiments changed to a null value which the system can then disregard). According to some embodiments, Step 412 is performed by the flag module 314 or the pre-delivery module 316, or some combination thereof.

In Step 414, if the TTL flag's time limit has not expired, and the user has transmitted the email by forwarding or sending the email to the pre-delivery recipient, then the pre-delivered email will be visibly displayed in the recipient's inbox. As discussed above, this involves instantaneously displaying the email in the recipient's inbox. That is, upon an executed delivery action (e.g., sending/forward action) by the sending user, the display flag is toggled so that the pre-delivered email is instantly displayed in the recipient's inbox. In some embodiments, the display flag is toggled from a "0" (do not display) value to a "1" (display value). Step 414 is performed by the delivery module 318. Thus, all data-transfer time is removed from forwarded emails as a near-instant deliver speed for emails of variable payload is achieved. Indeed, when a message is visibly displayed in a recipient's inbox, the display follows all other rules governing folder/inbox designation associated with the recipient's inbox.

However, should the TTL flag time limit have expired prior to the forwarding/sending of the email (i.e., the sender actually sending the email from his/her inbox—or the email server receiving an indication that the sending user is transmitting the message to the recipient), then the pre-delivered email is automatically deleted from the recipient's inbox without displaying the pre-delivered email. Step 416. In some embodiments, Step 414 is performed by the flag module 314, the pre-delivery module 316, the delivery module 318, or some combination thereof.

In some embodiments, when a user sends/forwards an email to another user, the sending user may add some content. For example, when Bob receives the JetBlue® email and forwards to his wife, he may add text stating "FYI". In such embodiments, an offset of content can be included as part of the event or transmission for updating the display flag. That is, the added content can be implemented as an update to the pre-delivered email. Thus, the content of the email can be updated upon the display flag being toggled. Therefore, in some embodiments, an indication to toggle the display flag, which is a result of a send/forward action by the sending user, can include additional information (i.e., the offset of content) which is being provided as an update to the pre-delivered email. Thus, from the above example, when Bob's email is visibly displayed in Jill's inbox, the email will include the text "FYI" in accordance with the content and layout Bob provided when executing the send/forward action from his email inbox. In this manner only the added information is sent when Bob "forwards" his message and the pre-delivery of the main portion of the message still yields a benefit in system efficiency.

Figure 5:
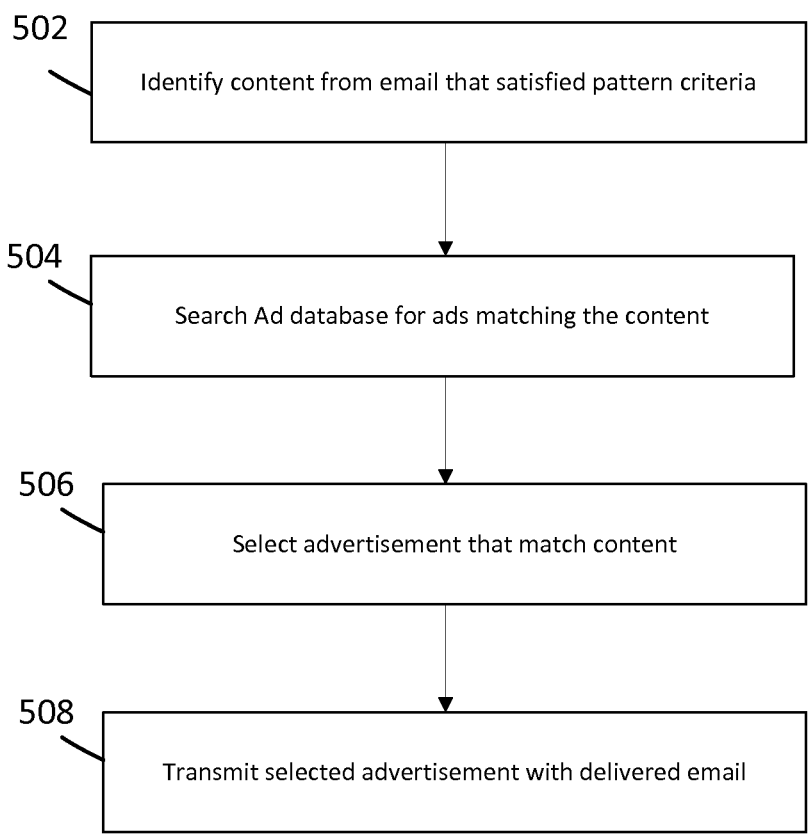
FIG. 5 is a flowchart illustrating steps performed in accordance with some embodiments of the present disclosure.

FIG. 5 is a work flow 500 of serving relevant advertisements based on the content satisfying the pattern criteria. Specifically, FIG. 5 illustrates how advertisements are served to a recipients of messages based on the specific content from the messages directed to a recipient. It should be understood that such content is not limited to the content of the email's body—such content can include, but is not limited to, the subject of the message, the sender's identity, the recipient's identity, the future recipient's identity subject to the recognized pattern and the like. Indeed, any and all types of email criteria, as discussed above, can form the basis for such content.

In Step 502, content from a message that meets certain pattern criteria (and triggers a rule), as discussed above, is identified. That is, content, or a type of content, associated with a pattern forms a basis for a context for serving advertisements having a similar context. In Step 504, the content (or content data) is communicated (or shared) from the email platform to an advertisement server 130. Upon receipt of the content data, the advertisement server 130 performs a search for a relevant advertisement within an associated advertisement database. The search for an advertisement is based at least on the extracted content.

In Step 504, the advertisement server 130 searches the advertisement database for advertisements that match the identified (and extracted) content. In Step 506, an advertisement is selected (or retrieved) based on the results of Step 504. In some embodiments, the advertisement can be selected based upon the result of Step 504, and modified to conform to attributes of the page or inbox upon which the advertisement will be displayed, and/or to the device for which it will be displayed. In some embodiments, as in Step 508, the selected advertisement is shared or communicated via the email platform. In some alternative embodiments, the selected advertisement is sent directly to each user's computing device. Thus, in conjunction with the above discussion, the selected advertisement is shared/communicated upon the pre-delivered email being visibly displayed in the recipient's inbox. The advertisement is displayed in conjunction with the email appearing in the recipient's inbox.

For example, from the above JetBlue® example, the content relates to Bob's travel itinerary. Therefore the ads can be selected to provide advertisements or promotions for deals in the identified destination city, or ads for future airline discounts/deals for JetBlue®, or a competing airline or travel service, for example. Here, for example, when Jill views the email, advertisements can appear in connection with the email, where the ad content corresponds to the Bob's travel itinerary (such as for example a pitch for a companion ticket).

Figure 6:
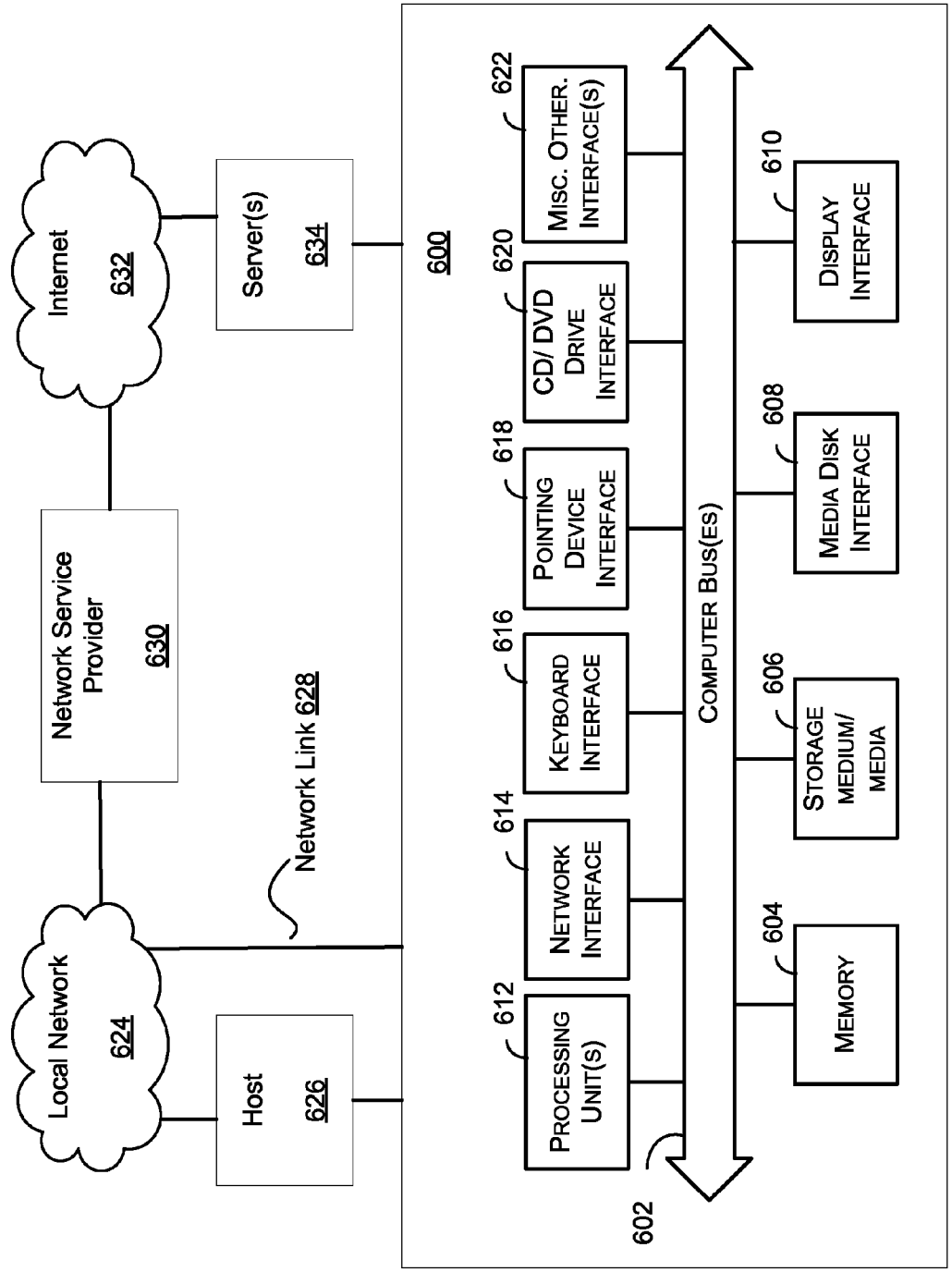
FIG. 6 is a block diagram illustrating architecture of a hardware device in accordance with one or more embodiments of the present disclosure.

As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving, at a computing device, a first email addressed to an inbox associated with a user;
analyzing, via the computing device, information associated with the first email, said analysis comprising comparing said email information with pattern information associated with said user;
creating, via the computing device, a second email for delivery from said user to a second user, said second email comprising a first display value dictating display in an inbox of said second user, said creation based upon said comparison of said email information and said pattern information, said second user identified as a recipient within said pattern information;

delivering, via the computing device, said second email to said inbox of the second user with said first display value, said delivery comprises communicating the second email to said second user with said first display value that prevents visible display of said second email in the inbox of the second user;

receiving, at the computing device, an indication from said user to deliver a message comprising said second email to said second user; and communicating, over a network, a second display value associated with said delivered second email to the inbox of said second user, said second display value facilitating visible display of said previously delivered second email in the inbox of the second user.

2. The method of claim 1, wherein said indication comprises a delivery action performed by the first user corresponding to the second email.

3. The method of claim 1, wherein said second email is based on said first email.

4. The method of claim 1, wherein said pattern information comprises a type of action said user performs in response to receiving a type of email, said type of action based upon behavior of said first user.

5. The method of claim 1, wherein said pattern information identifies at least one recipient the user identifies as an addressee of the second email in response to receiving said first email.

6. The method of claim 1, said second email further comprising a time-to-live (TTL) value, said TTL value dictating a time period said second email is available for visible display prior to receiving said indication.

7. The method of claim 6, further comprising:
monitoring said TTL value, wherein upon said time period expiring before said indication is received, said second email is automatically deleted.

8. The method of claim 1, further comprising:
communicating an offset from said second email, said offset comprising first user generated information, wherein communication of said second display value triggers the visible display of said second email with said offset.

9. The method of claim 1, wherein said delivery of said second email occurs during an off-peak time, said off-peak time comprising a time period during which email traffic is at or below a network threshold of activity.

10. A non-transitory computer-readable storage medium tangibly encoded with computer-executable instructions, that when executed by a processor associated with a computing device, performs a method comprising:

receiving a first email addressed to an inbox associated with a user;

analyzing information associated with the first email, said analysis comprising comparing said email information with pattern information associated with said user;

creating a second email for delivery from said user to a second user, said second email comprising a first display value dictating display in an inbox of said second user, said creation based upon said comparison of said email information and said pattern information, said second user identified as a recipient within said pattern information;

delivering said second email to said inbox of the second user, said delivery comprises communicating the second email to said second user without visibly displaying said second email in the inbox of the second user;

receiving an indication from said user to deliver said second email to said second user, said indication comprises a delivery action performed by the first user corresponding to the second email; and communicating, over a network, a second display value associated with said second email to the inbox of said second user, said second display value facilitating visible display of said second email in the inbox of the second user.

11. The non-transitory computer-readable storage medium of claim 10, wherein said second email is based on said first email.

12. The non-transitory computer-readable storage medium of claim 10, wherein said pattern information comprises a type of action said user performs in response to receiving a type of email, said pattern information identifies at least one recipient said user identifies as an addressee in response to receiving said first email.

13. The non-transitory computer-readable storage medium of claim 10, said second email further comprising a time-to-live (TTL) value, said TTL value dictating a time period said second email is available for visible display prior to receiving said indication.

14. The non-transitory computer-readable storage medium of claim 13, further comprising:
monitoring said TTL value, wherein upon said time period expiring before said indication is received, said second email is automatically deleted.

15. The non-transitory computer-readable storage medium of claim 10, further comprising:
communicating an offset from said second email, said offset comprising first user generated information, wherein communication of said second display value triggers the visible display of said second email with said offset.

16. A system comprising:
at least one computing device comprising:
memory storing computer-executable instructions; and
one or more processors for executing said computer-executable instructions for:
receiving a first message addressed to an inbox associated with a user;
analyzing information associated with the first message, said analysis comprising comparing said message information with pattern information associated with said user;
creating a second message for delivery from said user to a second user, said second message comprising a first display value dictating display in an inbox of said second user, said creation based upon said comparison of said message information and said pattern information, said second user identified as a recipient within said pattern information;
delivering said second message to said inbox of the second user, said delivery comprises communicating the second message to said second user without visibly displaying said second message in the inbox of the second user;
receiving an indication from said user to deliver said second message to said second user, said indication comprises a delivery action performed by the first user corresponding to the second message; and
communicating, over a network, a second display value associated with said second message to the inbox of said second user, said second display value facilitating visible display of said second message in the inbox of the second user.

17. The system of claim 16, wherein said second message further comprises a time-to-live (TTL) value, said TTL value dictating a time period said second message is available for visible display prior to receiving said indication, wherein said system further comprises:
    monitoring said TTL value, wherein upon said time period expiring before said indication is received, said second message is automatically deleted.

* * * * *